United States Patent
Faust et al.

(10) Patent No.: US 12,118,052 B2
(45) Date of Patent: *Oct. 15, 2024

(54) AUTOMATIC NAVIGATION OF INTERACTIVE WEB DOCUMENTS

(71) Applicant: GOOGLE LLC, Mountain View, CA (US)

(72) Inventors: Aleksandra Faust, Palo Alto, CA (US); Dilek Hakkani-Tur, Los Altos, CA (US); Izzeddin Gur, Goleta, CA (US); Ulrich Rueckert, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/234,766

(22) Filed: Aug. 16, 2023

(65) Prior Publication Data
US 2023/0394102 A1    Dec. 7, 2023

Related U.S. Application Data

(63) Continuation of application No. 17/280,027, filed as application No. PCT/US2019/053569 on Sep. 27, 2019, now Pat. No. 11,734,375.
(Continued)

(51) Int. Cl.
  *G06F 16/954*    (2019.01)
  *G06F 16/953*    (2019.01)
  *G06N 3/04*      (2023.01)

(52) U.S. Cl.
  CPC .......... *G06F 16/954* (2019.01); *G06F 16/953* (2019.01); *G06N 3/04* (2013.01)

(58) Field of Classification Search
  CPC ........ G06F 16/954; G06F 16/953; G06N 3/04
  See application file for complete search history.

(56) References Cited

U.S. PATENT DOCUMENTS 6,725,424 B1 *  4/2004  Schwerdtfeger .... G06F 16/9577
                                                        715/239
6,829,746 B1 * 12/2004  Schwerdtfeger ...... G06F 40/154
                                                        715/239
(Continued)

FOREIGN PATENT DOCUMENTS

CN    101846525    9/2010
CN    103970839    8/2014
(Continued)

OTHER PUBLICATIONS

Matiisen, Tambet; Demystifying deep reinforcement learning; neuro. cs. ut. ee. Computational Neuroscience Lab; dated 2015.
(Continued)

*Primary Examiner* — Mark E Hershley
(74) *Attorney, Agent, or Firm* — Gray Ice Higdon

(57) ABSTRACT

The present disclosure is generally directed to methods, apparatus, and computer-readable media (transitory and non-transitory) for learning to automatically navigate interactive web documents and/or websites. More particularly, various approaches are presented for training various deep Q network (DQN) agents to perform various tasks associated with reinforcement learning, including hierarchical reinforcement learning, in challenging web navigation environments with sparse rewards and large state and action spaces. These agents include a web navigation agent that can use learned value function(s) to automatically navigate through interactive web documents, as well as a training agent, referred to herein as a "meta-trainer," that can be trained to generate synthetic training examples. Some approaches described herein may be implemented when expert demon-
(Continued)

strations are available. Other approaches described herein may be implemented when expert demonstrations are not available. In either case, dense, potential-based rewards may be used to augment the training.

18 Claims, 12 Drawing Sheets

Related U.S. Application Data

(60) Provisional application No. 62/737,843, filed on Sep. 27, 2018.

(56) References Cited

U.S. PATENT DOCUMENTS

| | | | | |
|---|---|---|---|---|
| 6,847,960 | B1* | 1/2005 | Li | G06F 16/951 |
| 7,054,952 | B1* | 5/2006 | Schwerdtfeger | G06F 16/258 |
| | | | | 715/239 |
| 8,566,263 | B2* | 10/2013 | Flinn | G06N 20/00 |
| | | | | 706/14 |
| 9,311,670 | B2* | 4/2016 | Hoffberg | H04W 4/029 |
| 9,715,495 | B1* | 7/2017 | Tacchi | G06F 40/30 |
| 9,740,368 | B1* | 8/2017 | Love | G06F 3/04817 |
| 9,818,136 | B1* | 11/2017 | Hoffberg | G07F 17/323 |
| 9,836,183 | B1* | 12/2017 | Love | G06F 16/904 |
| 9,911,211 | B1* | 3/2018 | Damaraju | G06F 3/0488 |
| 9,977,729 | B1* | 5/2018 | Ivancic | G06F 11/3612 |
| 11,010,656 | B2* | 5/2021 | Mars | G10L 15/22 |
| 2003/0187744 | A1* | 10/2003 | Goodridge, Jr. | G06F 16/54 |
| | | | | 705/26.1 |
| 2004/0243356 | A1* | 12/2004 | Duffy | G06V 40/18 |
| | | | | 702/189 |
| 2008/0215566 | A1* | 9/2008 | Brooks | G06F 16/5838 |
| | | | | 707/999.005 |
| 2011/0113353 | A1* | 5/2011 | Koh | G08C 17/02 |
| | | | | 709/219 |
| 2013/0332398 | A1* | 12/2013 | Wu | G06N 20/00 |
| | | | | 706/12 |
| 2014/0201126 | A1* | 7/2014 | Zadeh | A61B 5/165 |
| | | | | 706/52 |
| 2015/0149168 | A1* | 5/2015 | Stent | G10L 15/22 |
| | | | | 704/235 |
| 2015/0364132 | A1* | 12/2015 | Goussard | G06F 16/3329 |
| | | | | 704/257 |
| 2015/0379430 | A1* | 12/2015 | Dirac | G06N 20/00 |
| | | | | 706/12 |
| 2016/0078019 | A1* | 3/2016 | Napieralski | G06F 3/167 |
| | | | | 704/2 |
| 2016/0092591 | A1* | 3/2016 | Barouni Ebrahimi | |
| | | | | G06F 16/2255 |
| | | | | 707/709 |
| 2016/0357851 | A1* | 12/2016 | Perkins | G06F 16/31 |
| 2017/0140755 | A1* | 5/2017 | Andreas | G06F 40/35 |
| 2017/0193367 | A1* | 7/2017 | Miikkulainen | G06F 16/26 |
| 2017/0308535 | A1* | 10/2017 | Agarwal | G06F 16/24578 |
| 2018/0113781 | A1* | 4/2018 | Kim | G06F 11/3414 |
| 2018/0121539 | A1* | 5/2018 | Ciulla | G06F 16/3344 |
| 2018/0165745 | A1* | 6/2018 | Zhu | G06Q 30/0631 |
| 2018/0204111 | A1* | 7/2018 | Zadeh | G06V 10/764 |
| 2018/0357240 | A1* | 12/2018 | Miller | G06N 5/022 |
| 2019/0005029 | A1* | 1/2019 | Mills | G06V 30/416 |
| 2019/0034083 | A1* | 1/2019 | Cherubini | G06F 3/0685 |
| 2019/0163747 | A1* | 5/2019 | Kang | G06N 3/044 |
| 2019/0251169 | A1* | 8/2019 | Loghmani | G06F 40/295 |
| 2019/0266076 | A1* | 8/2019 | Maliani | G06F 11/3684 |
| 2019/0327259 | A1* | 10/2019 | DeFelice | G06N 7/01 |
| 2020/0042642 | A1* | 2/2020 | Bakis | G06F 40/35 |
| 2020/0042649 | A1* | 2/2020 | Bakis | H04L 51/02 |
| 2020/0320116 | A1* | 10/2020 | Wu | H04L 51/10 |
| 2020/0341114 | A1* | 10/2020 | Acharya | G01S 13/723 |
| 2021/0334320 | A1* | 10/2021 | Faust | G06N 3/04 |

FOREIGN PATENT DOCUMENTS

| | | |
|---|---|---|
| CN | 105283837 | 1/2016 |
| CN | 107430859 | 12/2017 |
| CN | 107992587 | 5/2018 |
| CN | 108108387 | 6/2018 |
| WO | 2018068176 | 4/2018 |

OTHER PUBLICATIONS

European Patent Office; Communication pursuant to Article 94(3) issued in Application No. 19790360.2, 6 pages, dated Sep. 23, 2022.
Mesnil, G. et al., "Using Recurrent Neural Networks for Slot Filling in Spoken Language Understanding;" IEEE/ACM Transactions on Audio, Speech, and Language Processing; vol. 23, No. 3; pp. 530-539; Mar. 1, 2015.
European Patent Office; International Search Report and Written Opinion of Ser. No. PCT/US2019/053569; 15 pages; dated Dec. 10, 2019.
Abbeel et al., "Apprenticeship Learning via Inverse Reinforcement Learning" Proceedings of the 21st International Conference on Machine Learning. 2004. 8 pages.
Andrychowicz et al., "Learning to learn by gradient descent by gradient descent". 30th Conference on Neural Information Processing Systems (NIPS 2016). 9 pages.
Bengio et al., "Curriculum Learning" Proceedings of the 26th International Conference on Machine Learning. 2009. 8 pages.
Duan et al., "RL2: Fast Reinforcement Learning Via Slow Reinforcement Learning" arXiv:1611.02779v2 [cs.AI] dated Nov. 10, 2016. 14 pages.
Florensa et al., "Reverse Curriculum Generation for Reinforcement Learning" 1st Conference on Robot Learning (CoRL 2017). 14 pages.
Frans et al., "Meta Learning Shared Hierarchies" ICLR. 2018. 11 pages.
Graves et al., "Automated Curriculum Learning for Neural Networks" Proceedings of the 34th International Conference on Machine Learning. 2017. 10 pages.
Zheran et al., "Reinforcement Learning on Web Interfaces Using Workflow-Guided Exploration" ICLR. 2018. 15 pages.
Mnih et al., "Human-Level control through deep reinforcement learning" Macmillan Publishers Limited. vol. 518. doi:10.1038/nature14236 dated Feb. 26, 2015. 13 pages.
Shi et al., "World of Bits: An Open-Domain Platform for Web-Based Agents" Proceedings of the 34th International Conference on Machine Learning. 2017. 10 pages.
Wang et al., "Learning to Reinforcement Learn" arXiv:1611.05763v3 [cs.LG]. dated Jan. 23, 2017. 17 pages.
Zaremba et al., "Learning to Execute" arXiv:1410.4615v3 [cs.NE] dated Feb. 19, 2015. 25 pages.
Ng et al., "Policy invariance under reward transformations: Theory and application to reward shaping" Computer Science Division; 10 pages; dated 1999.
Shah et al., "FollowNet: Robot Navigation by Following Natural Language Directions with Deep Reinforcement Learning"; 6 pages; dated 2018.
Vinyals et al., "Grammar as a Foreign Language"; 9 pages; dated 2015.
China National Intellectual Property Administration; Notification of First Office Action issued in Application No. 201980064051.1; 13 pages; dated Jan. 8, 2024.
European Patent Office; Summons issued in Application No. 19790360.2; 7 pages; dated Jul. 25, 2024.

\* cited by examiner

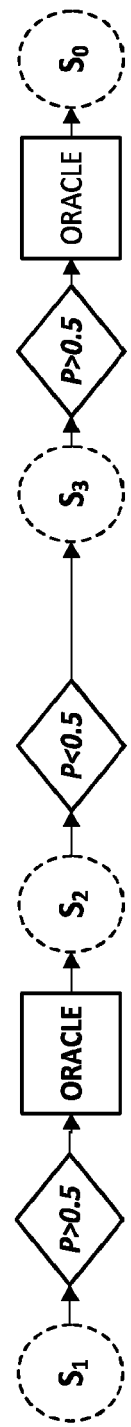

Algorithm 1 Curriculum-DQN.
  Input: ORACLE policy
  Input: Sampling probability $p$ and decay rate $d$
  Web Environment, $ENV_W$
  for number of training steps do
      $(I, D, G) \leftarrow$ Sample instruction, initial, and goal states from environment.
      //Warm-starting the episode.
      for each DOM element $e$ in $D$ do
          $\hat{D} \leftarrow$ Get new state from ORACLE($I, e$) with probability $p$.
      end for
      // Collect experience and train QWeb starting from the final state $\hat{D}$.
      Run Algorithm 2 (QWeb, $I, \hat{D}, ENV_W$)
      Decrease $p$ by a factor of $d$
  end for

Fig. 5

Algorithm 2 One-step DQN training.

Input: DQN
   Input: Goal state, $G$
   Input: Set of initial states, $\hat{S}$
   Input: Environment, $ENV$
   *//Run DQN policy to collect experience.*
   for $S \in \hat{S}$ do
      $S_i \leftarrow S$
      while environment is not terminated do
         $o \leftarrow \text{DQN}(G, S_i)$ to get logits over actions.
         $a \leftarrow$ Sample from a categorical distribution $Cat(o)$.
         $(S_{i+1}, R_i) \leftarrow$ Run action $a$ in the environment and collect new state and reward.
         Add $(S_i, a, s_{i+1}, R_i)$ to replay buffer.
         $S_i \leftarrow S_{i+1}$
      end while
   end for
   *// Update DQN parameters.*
   for number of updates per episode do
      Sample experience batch from replay buffer.
      Update DQN parameters by running a single step of gradient descent.
   end for

Fig. 6

Algorithm 3 Meta-learning for training QWeb.

instruction generation environment, $ENV_I$
// *Training instructor agent INET.*
for number of training steps do
    $(G, K_0, I) \leftarrow$ Sample goal (a DOM tree), initial state, and instruction from $ENV_I$.
    Run Algorithm 2 $(INET, I, (K_0, G), ENV_I)$
end for
Fix the parameters of $INET$.
// *QWeb meta-training via task generation.*
for number of training steps do
    // *Generate new instruction following task.*
    $(G, P) \leftarrow$ Run $RRND()$ and get goal state and sequence of state, $G$, action pairs, $P$.
    Using $P$ get a dense reward $\hat{R}$.
    $I \leftarrow$ Run $INET(G)$ and get instruction $I$.
    Set up the $ENV_{DR}$ with new task $(I, G)$ and dense rewards.
    $D_0 \leftarrow$ Sample an initial state from the web environment.
    // *Collect experience and train QWeb in environment with dense rewards* $ENV_{DR}$.
    Run Algorithm 2 (QWeb, $I, D_0, ENV_{DR}$)
end for

Fig. 7

AUTOMATIC NAVIGATION OF INTERACTIVE WEB DOCUMENTS

BACKGROUND

Reinforcement learning ("RL") is challenging in environments having large state and action spaces, and especially when only sparse rewards are available. In one example of such an environment, RL may be used to train a RL policy that is then used by an automated assistant (also referred to as a "virtual assistant," "chatbots," "digital assistant," etc.) automatically navigate web documents (e.g., webpages) based on users' intents determined from natural language instructions. The potential input vocabulary and number of actionable elements in such a scenario can grow quite large.

In a typical web environment, an automated assistant might need to carefully navigate through a large number of interactive input components (e.g., document object model or "DOM" elements) to follow highly dynamic instructions formulated from large vocabularies. For example, suppose a user issues the natural language instruction, "Book a flight from WTK to LON on 21-Oct-2016." The automated assistant (or a separate web navigation acting in cooperation with the automated assistant) may need to fill out origin and destination drop down menus on the web page with the correct airport codes, select a date, hit a submit button, and then select the cheapest flight among all the options that are returned.

This is not a trivial task for an automated assistant, or a web navigation agent if distinct from the automated assistant. The first three fields may be filled out in any order. Moreover, the options for selection are numerous, and among all possible airport/date combinations, only one conforms to the user's request. In some cases the web page form can only be submitted once all the three fields are filled in. At that point the web environment/web page changes, and flight selection becomes possible. Then, a flight can be selected and booked. Reaching the true objective in such tasks through trial-and-error is cumbersome given the large state and action spaces. Reinforcement learning with sparse rewards results in the majority of the episodes generating no signal at all. The problem is exacerbated when learning from large set of instructions where visiting each option could be infeasible.

SUMMARY

The present disclosure is generally directed to methods, apparatus, and computer-readable media (transitory and non-transitory) for learning to automatically navigate interactive web documents and/or websites. More particularly, various approaches are presented for training various deep Q network (DQN) agents to perform various tasks associated with reinforcement learning, including hierarchical reinforcement learning, in challenging web navigation environments with sparse rewards and large state and action spaces. These agents include a web navigation that can use learned value function(s) to automatically navigate through interactive web documents, as well as a training agent, referred to herein as a "meta-trainer," that can be trained to generate synthetic training examples. Some approaches described herein may be implemented when expert demonstrations are available. Other approaches described herein may be implemented when expert demonstrations are not available. In either case, dense, potential-based rewards may be used to augment the training.

When an expert demonstrations are available, curriculum learning may be employed to decompose a complex instruction into multiple, simpler sub-instructions. A web navigation agent configured with selected aspects of the present disclosure may be assigned incrementally larger subsets of these sub-instructions, until it ultimately uncovers the original complex instruction. When expert demonstrations are not available, the aforementioned meta-trainer may be used to generate goal states and instruction pairs with dense reward signals for the web navigation agent to train more efficiently. Disclosed models outperform previous state-of-the-art models on challenging environments without using any human demonstration.

In some implementations, a computer implemented method may be provided that includes: determining a natural language input, wherein the natural language input comprises a command to perform a task; analyzing the natural language input to identify one or more key-value pairs; retrieving an interactive web document that is operable via a graphical user interface ("GUI") to perform the task, wherein the interactive web document includes one or more constituent interactive elements that are operable to input one or more values of the one or more key-value pairs; encoding the one or more parameters key-value pairs into one or more instruction feature vectors; encoding overlapping content between the one or more key-value pairs and the one or more interactive elements into one or more overlap feature vectors; encoding the one or more interactive elements of the interactive web document into one or more interactive element feature vectors; conditioning the one or more interactive element feature vectors based on the one or more overlap feature vectors; generating, based on the one or more conditioned interactive element feature vectors and the one or more instruction feature vectors, one or more Q-values for each of the one or more interactive elements; and facilitating automated navigation through the interactive web document in response to the natural language input based at least in part on the Q values.

This method and other implementations of technology disclosed herein may each optionally include one or more of the following features.

In various implementations, the one or more interactive elements comprise document object model ("DOM") nodes. In various implementations, the method may further include linearizing a tree structure that represents the DOM nodes. In various implementations, a long-short term memory ("LSTM") network may be used to encode the one or more interactive element feature vectors. In various implementations, the LSTM network comprises a bidirectional LSTM network.

In various implementations, each of the one or more parameters may be a key-value pair. In various implementations, the one or more Q values generated for a given interactive element of the one or more constituent interactive elements may take the form of a composite Q value. In various implementations, the composite Q value may include an interactive element Q value, a click-or-type Q value, and a type Q value.

In another aspect, a computer-implemented method may include: determining a set of keys that are applicable to an interactive web document that is operable to perform a task, wherein the interactive web document includes a plurality of constituent interactive elements that are operable to input a corresponding plurality of values; automatically populating at least some of the plurality of constituent interactive elements with arbitrary values to generate a target state of the interactive web document; encoding at least the populated interactive elements of the plurality of interactive elements into a plurality of interactive element feature vectors; selecting a key from the set of keys; encoding at least the selected key into a key feature vector; based on the key feature vector and the plurality of interactive element feature vectors, calculating Q values for at least the populated interactive elements; selecting an interactive element from the populated interactive elements based on the Q values; and generating an instruction based on the selected key and the arbitrary value used to populate the selected interactive element.

In various implementations, the instruction may include one or more fields, each of the one or more fields comprising a key-value pair. In various implementations, an LSTM network is used to encode the plurality of interactive element feature vectors. In various implementations, the LSTM network comprises a bidirectional LSTM network.

In various implementations, the plurality of interactive elements may include DOM elements. In various implementations, the Q values for at least the populated interactive elements comprise a Q value for each DOM element and a Q value for each attribute of each DOM element. In various implementations, the arbitrary values may be random values.

Other implementations may include a non-transitory computer readable storage medium storing instructions executable by a processor to perform a method such as one or more of the methods described above. Yet another implementation may include a system including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 4A, FIG. 4B, FIG. 4C, and FIG. 4D depict various states of an interactive web document—in this example a flight booking web page—that can be automatically navigated using techniques described herein.

FIG. 4E demonstrates how the different web document states of FIGS. 4A-D may be analyzed, in accordance with various implementations.

FIG. 5 depicts a pseudo algorithm for implementing curriculum learning to efficiently train a machine learning architecture such as that depicted in FIG. 3.

FIG. 6 depicts a pseudo algorithm for training a web navigation machine learning architecture such as QWeb depicted in FIG. 3.

FIG. 7 depicts a pseudo algorithm for training a synthetic training data machine learning architecture, such as INET depicted in FIG. 8, so that it can be used, e.g., by a meta-trainer configured with selected aspects of the present disclosure, to generate synthetic expert demonstrations that in turn can be used to train a web navigation machine learning architecture such as QWeb depicted in FIG. 3.

DETAILED DESCRIPTION

Figure 1:
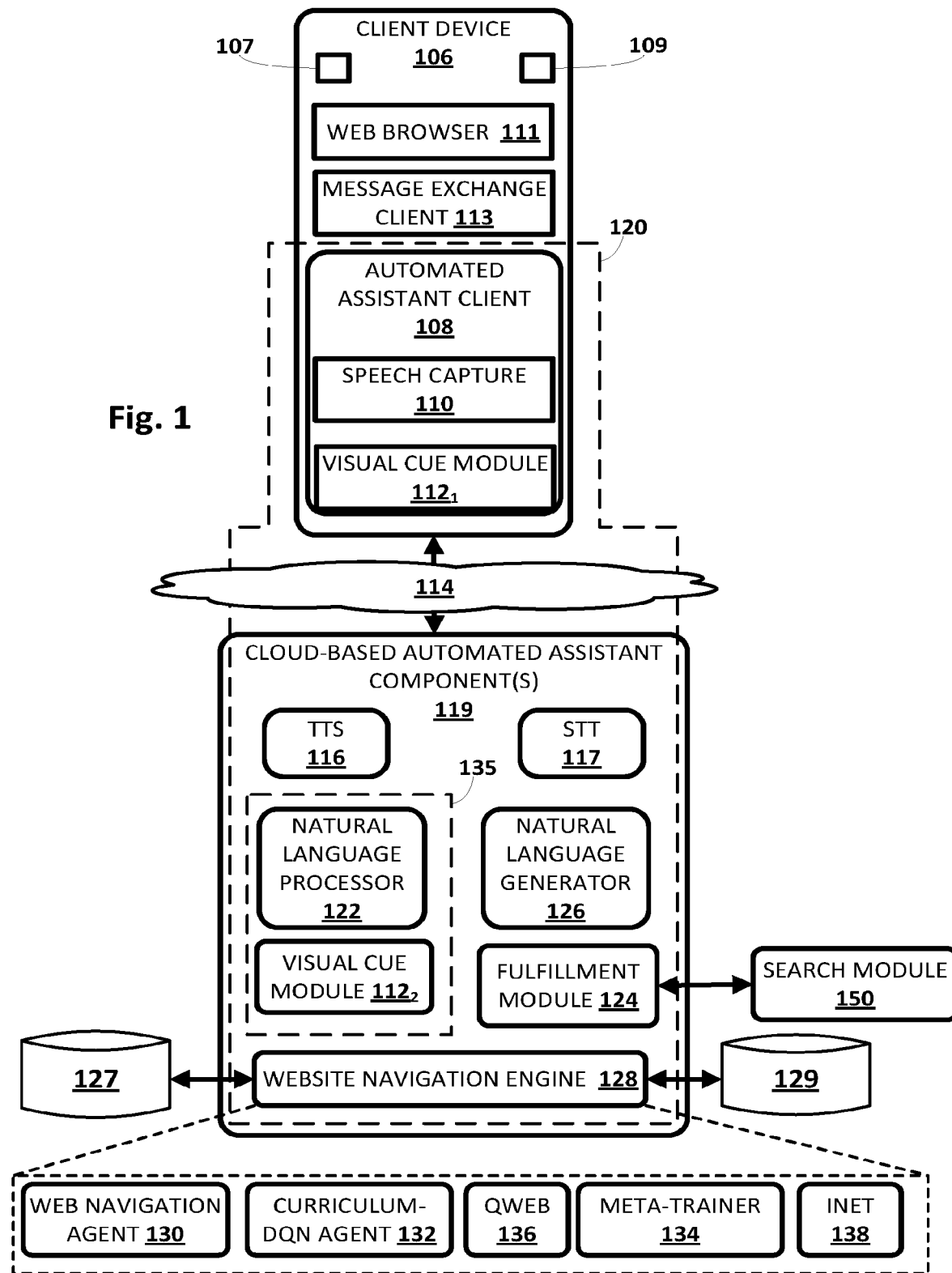
FIG. 1 illustrates an environment in which techniques described herein may be implemented, in accordance with various implementations.

Now turning to FIG. 1, an example environment in which techniques disclosed herein may be implemented is illustrated. The example environment includes one or more client computing devices 106. Each client device 106 may execute a respective instance of an automated assistant client 108, which may also be referred to herein as a "client portion" of an automated assistant. One or more cloud-based automated assistant components 119, which may also be referred to herein collectively as a "server portion" of an automated assistant, may be implemented on one or more computing systems (collectively referred to as a "cloud" computing system) that are communicatively coupled to client devices 106 via one or more local and/or wide area networks (e.g., the Internet) indicated generally at 114.

In various implementations, an instance of an automated assistant client 108, by way of its interactions with one or more cloud-based automated assistant components 119, may form what appears to be, from the user's perspective, a logical instance of an automated assistant 120 with which the user may engage in a human-to-computer dialog. One instance of such an automated assistant 120 is depicted in FIG. 1 in dashed line. It thus should be understood that each user that engages with an automated assistant client 108 executing on a client device 106 may, in effect, engage with his or her own logical instance of an automated assistant 120. For the sakes of brevity and simplicity, the term "automated assistant" as used herein as "serving" a particular user will refer to the combination of an automated assistant client 108 executing on a client device 106 operated by the user and one or more cloud-based automated assistant components 119 (which may be shared amongst multiple automated assistant clients 108). It should also be understood that in some implementations, automated assistant 120 may respond to a request from any user regardless of whether the user is actually "served" by that particular instance of automated assistant 120.

The one or more client devices 106 may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker (which in some cases may include a vision sensor), a smart appliance such as a smart television (or a standard television equipped with a networked dongle with automated assistant capabilities), and/or a wearable apparatus of the user that includes a computing device (e.g., a watch of the user having a computing device, glasses of the user having a computing device, a virtual or augmented reality computing device). Additional and/or alternative client computing devices may be provided. Some client devices 106, such as standalone interactive speakers (or "smart speakers"), may take the form of assistant devices that are primarily designed to facilitate dialog between users and automated assistant 120. Some such assistant devices may take the form of a standalone interactive speaker with an attached display, which may or may not be a touchscreen display.

In some implementations, client device 106 may be equipped with one or more vision sensors 107 having one or more fields of view, although this is not required. Vision sensor(s) 107 may take various forms, such as digital cameras, passive infrared ("PIR") sensors, stereoscopic cameras, RGBd cameras, etc. The one or more vision sensors 107 may be used to capture image frames (still images or video) of an environment in which client device 106 is deployed. These image frames may then be analyzed, e.g., by a visual cue module $112_1$, to detect user-provided visual cues contained in the image frames. //b/These visual cues may include but are not limited to hand gestures, gazes towards particular reference points, facial expressions, predefined movements by users, etc. These detected visual cues may be used for various purposes, such as invoking automated assistant 120 and/or causing automated assistant 120 to perform various actions.

As described in more detail herein, automated assistant 120 engages in human-to-computer dialog sessions with one or more users via user interface input and output devices of one or more client devices 106. In some implementations, automated assistant 120 may engage in a human-to-computer dialog session with a user in response to user interface input provided by the user via one or more user interface input devices of one of the client devices 106. In some of those implementations, the user interface input is explicitly directed to automated assistant 120. For example, a user may verbally provide (e.g., type, speak) a predetermined invocation phrase, such as "OK, Assistant," or "Hey, Assistant." When spoken, this verbal input may be captured by a microphone 109 and may cause automated assistant 120 to begin actively listening or monitoring typed text. Additionally or alternatively, in some implementations, automated assistant 120 may be invoked based on one or more detected visual cues, alone or in combination with oral invocation phrases.

In some implementations, automated assistant 120 may engage in a human-to-computer dialog session in response to user interface input, even when that user interface input is not explicitly directed to automated assistant 120. For example, automated assistant 120 may examine the contents of user interface input and engage in a dialog session in response to certain terms being present in the user interface input and/or based on other cues. In many implementations, automated assistant 120 may utilize speech recognition to convert utterances from users into text, and respond to the text accordingly, e.g., by providing search results, general information, and/or taking one or more responsive actions (e.g., playing media, launching a game, ordering food, etc.). In some implementations, the automated assistant 120 can additionally or alternatively respond to utterances without converting the utterances into text. For example, the automated assistant 120 can convert voice input into an embedding, into entity representation(s) (that indicate entity/entities present in the voice input), and/or other "non-textual" representation and operate on such non-textual representation. Accordingly, implementations described herein as operating based on text converted from voice input may additionally and/or alternatively operate on the voice input directly and/or other non-textual representations of the voice input.

Each of client computing device 106 and computing device(s) operating cloud-based automated assistant components 119 may include one or more memories for storage of data and software applications, one or more processors for accessing data and executing applications, and other components that facilitate communication over a network. The operations performed by client computing device 106 and/or by automated assistant 120 may be distributed across multiple computer systems. Automated assistant 120 may be implemented as, for example, computer programs running on one or more computers in one or more locations that are coupled to each other through a network.

As noted above, in various implementations, client computing device 106 may operate an automated assistant client 108, or "client portion" of automated assistant 120. In various implementations, automated assistant client 108 may include a speech capture module 110 and/or a visual cue module $112_1$. In other implementations, one or more aspects of speech capture module 110 and/or visual cue module 112 may be implemented separately from automated assistant client 108, e.g., by one or more cloud-based automated assistant components 119. For example, in FIG. 1, there is also a cloud-based visual cue module $112_2$ that may detect visual cues in image data.

In various implementations, speech capture module 110, which may be implemented using any combination of hardware and software, may interface with hardware such as microphone 109 or other pressure sensor to capture an audio recording of a user's utterance(s). Various types of processing may be performed on this audio recording for various purposes.

In various implementations, visual cue module $112_1$ (and/or cloud-based visual cue module $112_2$) may be implemented using any combination of hardware or software, and may be configured to analyze one or more image frames provided by vision sensor(s) 107 to detect one or more visual cues captured in and/or across the one or more image frames. Visual cue module $112_1$ may employ a variety of techniques to detect visual cues. For example, visual cue module $112_1$ (or $112_2$) may use one or more artificial intelligence (or machine learning) models that are trained to generate output indicative of detected user-provided visual cues in image frames.

Client device 106 may have other applications installed as well, such as a web browser 111 and/or a message exchange client 113. Message exchange client 113 may come in various forms. In some implementations, message exchange client 113 may come in the form of a short messaging service ("SMS") and/or multimedia messaging service ("MMS") client, an online chat client (e.g., instant messenger, Internet relay chat, or "IRC," etc.), a messaging application associated with a social network, and so forth. In some implementations, message exchange client 113 may be implemented within a webpage rendered by web browser 111. In various implementations, message exchange client 113 may provide an interface for a user to engage in typed or spoken human-to-computer dialog with automated assistant 120, as a one-on-one dialog or as a multi-participant dialog in which automated assistant 120 may "participate." In some implementations, web browser 111 may be specially designed, e.g., with a microphone button or other user interface element that is operable to invoke automated assistant 120, so that the user is able to issue voice commands to aid in operation of web browser 111.

Speech capture module 110 may be configured to capture a user's speech, e.g., via a microphone 109, as mentioned previously. Additionally or alternatively, in some implementations, speech capture module 110 may be further configured to convert that captured audio to text and/or to other representations or embeddings, e.g., using speech-to-text ("STT") processing techniques. Additionally or alternatively, in some implementations, speech capture module 110 may be configured to convert text to computer-synthesized speech, e.g., using one or more voice synthesizers. However, in some (but not all) cases, because client device 106 may be relatively constrained in terms of computing resources (e.g., processor cycles, memory, battery, etc.), speech capture module 110 local to client device 106 may be configured to convert a finite number of different spoken phrases— particularly phrases that invoke automated assistant 120—to text (or to other forms, such as lower dimensionality embeddings). Other speech input may be sent to cloud-based automated assistant components 119, which may include a cloud-based text-to-speech ("TTS") module 116 and/or a cloud-based STT module 117.

Cloud-based TTS module 116 may be configured to leverage the virtually limitless resources of the cloud to convert textual data (e.g., natural language responses formulated by automated assistant 120) into computer-generated speech output. In some implementations, TTS module 116 may provide the computer-generated speech output to client device 106 to be output directly, e.g., using one or more speakers. In other implementations, textual data (e.g., natural language responses) generated by automated assistant 120 may be provided to speech capture module 110, which may then convert the textual data into computer-generated speech that is output locally.

Cloud-based STT module 117 may be configured to leverage the virtually limitless resources of the cloud to convert audio data captured by speech capture module 110 into text, which may then be provided to intent matcher 135. In some implementations, cloud-based STT module 117 may convert an audio recording of speech to one or more phonemes, and then convert the one or more phonemes to text. Additionally or alternatively, in some implementations, STT module 117 may employ a state decoding graph. In some implementations, STT module 117 may generate a plurality of candidate textual interpretations of the user's utterance. In some implementations, STT module 117 may weight or bias particular candidate textual interpretations higher than others depending on whether there are contemporaneously detected visual cues.

Automated assistant 120 (and in particular, cloud-based automated assistant components 119) may include intent matcher 135, the aforementioned TTS module 116, the aforementioned STT module 117, and other components that are described in more detail below. In some implementations, one or more of the modules and/or modules of automated assistant 120 may be omitted, combined, and/or implemented in a component that is separate from automated assistant 120. In some implementations, to protect privacy, one or more of the components of automated assistant 120, such as natural language processor 122, TTS module 116, STT module 117, etc., may be implemented at least in part on client devices 106 (e.g., to the exclusion of the cloud).

In some implementations, automated assistant 120 generates responsive content in response to various inputs generated by a user of one of the client devices 106 during a human-to-computer dialog session with automated assistant 120. Automated assistant 120 may provide the responsive content (e.g., over one or more networks when separate from a client device of a user) for presentation to the user as part of the dialog session. For example, automated assistant 120 may generate responsive content in response to free-form natural language input provided via client device 106. As used herein, free-form input is input that is formulated by a user and that is not constrained to a group of options presented for selection by the user. Free form natural language input may be spoken (and captured by microphone 109) and/or typed (e.g., into one or more interfaces provided by one or more applications, such as message exchange client 113).

An intent matcher 135 may be configured to determine a user's intent based on input(s) (e.g., vocal utterances, visual cues, etc.) provided by the user and/or based on other signals, such as sensor signals, online signals (e.g., data obtained from web services), and so forth. In some implementations, intent matcher 135 may include a natural language processor 122 and the aforementioned cloud-based visual cue module $112_2$. In various implementations, cloud-based visual cue module $112_2$ may operate similarly to visual cue module $112_1$ except that cloud-based visual cue module $112_2$ may have more resources at its disposal. In particular, cloud-based visual cue module $112_2$ may detect visual cues that may be used by intent matcher 135, alone or in combination with other signals, to determine a user's intent.

Natural language processor 122 may be configured to process natural language input generated by user(s) via client device 106 and may generate annotated output (e.g., in textual form) for use by one or more other components of automated assistant 120. For example, the natural language processor 122 may process natural language free-form input that is generated by a user via one or more user interface input devices of client device 106. The generated annotated output includes one or more annotations of the natural language input and one or more (e.g., all) of the terms of the natural language input.

In some implementations, the natural language processor 122 is configured to identify and annotate various types of grammatical information in natural language input. For example, the natural language processor 122 may include a morphological module that may separate individual words into morphemes and/or annotate the morphemes, e.g., with their classes. Natural language processor 122 may also include a part of speech tagger configured to annotate terms with their grammatical roles. For example, the part of speech tagger may tag each term with its part of speech such as "noun," "verb," "adjective," "pronoun," etc. Also, for example, in some implementations the natural language processor 122 may additionally and/or alternatively include a dependency parser (not depicted) configured to determine syntactic relationships between terms in natural language input. For example, the dependency parser may determine which terms modify other terms, subjects and verbs of sentences, and so forth (e.g., a parse tree) and may make annotations of such dependencies.

In some implementations, the natural language processor 122 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. For example, a "banana" node may be connected (e.g., as a child) to a "fruit" node," which in turn may be connected (e.g., as a child) to "produce" and/or "food" nodes. As another example, a restaurant called "Hypothetical Café" may be represented by a node that also includes attributes such as its address, type of food served, hours, contact information, etc. The "Hypothetical Café" node may in some implementations be connected by an edge (e.g., representing a child-to-parent relationship) to one or more other nodes, such as a "restaurant" node, a "business" node, a node representing a city and/or state in which the restaurant is located, and so forth.

The entity tagger of the natural language processor 122 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the natural language processor 122 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there."

In some implementations, one or more components of the natural language processor 122 may rely on annotations from one or more other components of the natural language processor 122. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the natural language processor 122 may use related prior input and/or other related data outside of the particular natural language input to determine one or more annotations.

Intent matcher 135 may use various techniques to determine an intent of the user, e.g., based on output from natural language processor 122 (which may include annotations and terms of the natural language input) and/or based on output from visual cue module (e.g., 112₁ and/or 112₂). In some implementations, intent matcher 135 may have access to one or more databases (not depicted) that include, for instance, a plurality of mappings between grammars, visual cues, and responsive actions (or more generally, intents). In many cases, these grammars may be selected and/or learned over time, and may represent the most common intents of users. For example, one grammar, "play <artist>", may be mapped to an intent that invokes a responsive action that causes music by the <artist> to be played on the client device 106 operated by the user. Another grammar, "[weather|forecast] today," may be match-able to user queries such as "what's the weather today" and "what's the forecast for today?"

In addition to or instead of grammars, in some implementations, intent matcher 135 may employ one or more trained machine learning models, alone or in combination with one or more grammars and/or visual cues. These trained machine learning models may also be stored in one or more databases and may be trained to identify intents, e.g., by embedding data indicative of a user's utterance and/or any detected user-provided visual cues into a latent or embedding space, and then determining which other embeddings (and therefore, intents) are most proximate, e.g., using techniques such as Euclidean distance, cosine similarity, etc.

As seen in the "play <artist>" example grammar, some grammars have slots (e.g., <artist>) that can be filled with slot values (or "parameters"). Slot values may be determined in various ways. Often users will provide the slot values proactively. For example, for a grammar "Order me a <topping> pizza," a user may likely speak the phrase "order me a sausage pizza," in which case the slot <topping> is filled automatically. Additionally or alternatively, if a user invokes a grammar that includes slots to be filled with slot values, without the user proactively providing the slot values, automated assistant 120 may solicit those slot values from the user (e.g., "what type of crust do you want on your pizza?").

Fulfillment module 124 may be configured to receive the predicted/estimated intent that is output by intent matcher 135, as well as an associated slot values (whether provided by the user proactively or solicited from the user) and carry out (or "resolve," or "fulfill") the intent. In various implementations, fulfillment (or "resolution" or "carrying out") of the user's intent may cause various fulfillment information (also referred to as "responsive" information or "resolution information") to be generated/obtained, e.g., by fulfillment module 124. As will be described below, the fulfillment information may in some implementations be provided to a natural language generator ("NLG" in some FIGS. 126, which may generate natural language output based on the fulfillment information.

Fulfillment (or "resolution") information may take various forms because an intent can be fulfilled (or "resolved") in a variety of ways. Suppose a user requests pure information, such as "Where were the outdoor shots of 'The Shining' filmed?" The intent of the user may be determined, e.g., by intent matcher 135, as being a search query. The intent and content of the search query may be provided to fulfillment module 124, which as depicted in FIG. 1 may be in communication with one or more search modules 150 configured to search corpuses of documents and/or other data sources (e.g., knowledge graphs, etc.) for responsive information. Fulfillment module 124 may provide data indicative of the search query (e.g., the text of the query, a reduced dimensionality embedding, etc.) to search module 150. Search module 150 may provide responsive information, such as GPS coordinates, or other more explicit information, such as "Timberline Lodge, Mt. Hood, Oregon." This responsive information may form part of the fulfillment information generated by fulfillment module 124.

Additionally or alternatively, fulfillment module 124 may be configured to receive, e.g., from intent matcher 135, a user's intent and any slot values provided by the user or determined using other means (e.g., GPS coordinates of the user, user preferences, etc.) and trigger a responsive action. Responsive actions may include, for instance, ordering a good/service, starting a timer, setting a reminder, initiating a phone call, playing media, sending a message, operating a smart appliance such as a light or thermostat, etc. In some such implementations, fulfillment information may include slot values associated with the fulfillment, confirmation responses (which may be selected from predetermined responses in some cases), etc.

Natural language generator 126 may be configured to generate and/or select natural language output (e.g., words/phrases that are designed to mimic human speech) based on data obtained from various sources. In some implementations, natural language generator 126 may be configured to receive, as input, fulfillment information associated with fulfillment of an intent, and to generate natural language output based on the fulfillment information. Additionally or alternatively, natural language generator 126 may receive information from other sources, such as third party applications (e.g., required slots), which it may use to compose natural language output for the user.

Various aspects of the present disclosure may be implemented in whole or in part by website navigation engine 128. To this end, in various implementations, website navigation engine 128 may include a web navigation agent 130, a training agent that takes the form of a "curriculum-DQN" agent 132, and another training agent that is referred to herein as a "meta-trainer" 136. Agents 130, 132, and 136 may be implemented using any combination of hardware and computer-implemented instructions (e.g., software). In other implementations, more or less agents may be included to perform selected aspects of the present disclosure.

Web navigation agent 130 may be configured to facilitate automatic navigation of interactive web documents (e.g., web pages) in response to natural language instructions provided by users, such as "find me a ticket from London to Paris on June 12." To this end, web navigation agent 130 may rely on various types of policies, which in many implementations may take the form of machine learning model(s), such as one or more deep Q networks ("DQN") that are trained using reinforcement learning. In particular, web navigation agent 130 may analyze intent(s) determined from natural language instructions, e.g., by intent matcher 135 as described previously. Web navigation agent 130 may also analyze a target interactive web document that is usable to fulfill the intent(s).

Figure 2:
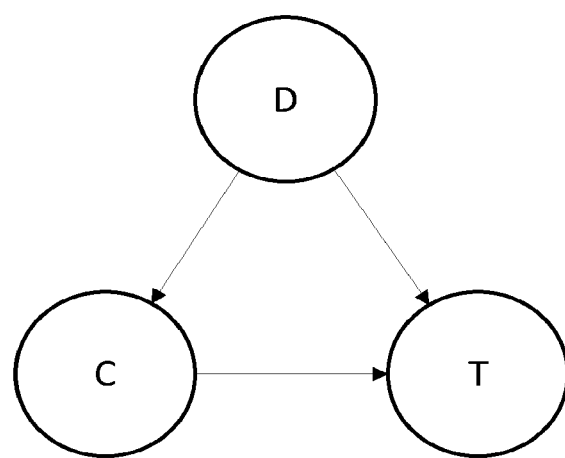
FIG. 2 depicts an example action dependency graph for hierarchical Q learning, in accordance with various implementations.

In performing these analysis, web navigation agent 130 may use a trained web navigation machine learning architecture that is referred to herein as "QWeb" 136 to generate encodings of key-value pair(s) (or "fields") forming the user's intent, as well as encodings of constituent interactive elements of the interactive web document that is being used to fulfill the user's intent. Using these encodings, web navigation agent 130 may generate a hierarchy (demonstrated in FIG. 2) of Q values that identify (i) which constituent interactive element would generate the most value if acted upon, (ii) whether clicking the interactive element or typing text into the element would generate the greatest value, and (iii) if the action is to type something into the element, what should be typed (e.g., an airport code) in order to generate the greatest value. In various implementations, the constituent interactive elements may include a plurality (e.g., a hierarchy) of document object model ("DOM") elements that are operable by a user to provide input. These may include, for instance, text fields, pull down menus, radio buttons, fillable calendars, fillable seating charts, sliders, check boxes, etc.

A current state that may be used by web navigation engine 130 to select a next action (based on a Q value calculated using QWeb 136) may be generated from various information and may take various forms. As a non-limiting example, a user state may be a data structure such as a semantically rich feature vector, embedding, etc. The user state may be generated at least in part based on content of a particular interactive web document under consideration (particularly its constituent interactive elements and relationships therebetween), as well as an intent ascertained from a natural language instruction. As described herein, an intent may take the form of a number of fields, with each field including a key (e.g., "from") and a corresponding value ("London"). In some implementations, the state may also include information about overlap between the intent and attribute(s) of the constituent interactive elements. In some such implementations, DOM element encodings may be conditioned based on such overlap.

Additionally, in some implementations, various information about a user, e.g., obtained from a user's profile, may be included in a user state. For example, various user preferences, such as a preferred payment method, whether a user should be solicited for payment information at each transaction, a user's preferred seating position (e.g., aisle/window on an airplane, section of a movie theatre or sports event, etc.), preferred price ranges, or various other product- or service-specific parameters (e.g., vegetarian or vegan, smoking or nonsmoking, etc.) may be baked into a user state. Other user profile information that may be included in a user state include, but are not limited to, appointments on a user's electronic calendar (e.g., which may be used to automatically eliminate a movie show time if the user has a conflict), contents of electronic communications such as emails, text messages, etc. (including metadata associated therewith), social media posts (e.g., status updates, uploaded pictures, etc.), and so forth.

User preferences may be determined in various ways. In some implementations they may be set manually, e.g., using a graphical user interface or by a user telling automated assistant 120 of his or her preferences. Additionally or alternatively, in some implementations, some user preferences may be learned over time, e.g., based on user interaction with interactive websites, user interaction with automated assistant 120, etc. For example, suppose when purchasing goods or services using web browser 111, a user always clicks through confirmation screens relatively quickly (e.g., more quickly than would typically be required to fully consume whatever disclaimer or other language is presented). That may be taken into account in determining that the user is likely comfortable with those screens being automatically navigated through, e.g., by website navigation engine 128 and/or automated assistant, without requiring explicit input from the user.

To recap, website navigation engine 128 may implement one or more reinforcement learning ("RL") agents in various scenarios. Some of these agents, such as the web navigation agent 130 described above, may be trained to navigate through, and interact with, interactive web documents and/or websites in response to natural language instructions. Other agents may be used to train web navigation agent 130, e.g., by generating training data and/or managing the training process. These agents, such as curriculum-DQN agent 132 and meta-trainer 136, will now be described in more detail.

When expert demonstrations (e.g., a temporarily recorded sequence of actions taken by a human when filling out an interactive web form) or an instruction-following policy (referred to herein as an "ORACLE") are available, curriculum learning may be employed, e.g., by way of the aforementioned curriculum-DQN agent 132, to guide exploration of web navigation agent 130 through the large state and action spaces. Curriculum-DQM agent 132 may begin with a relatively simple instruction-following task. Curriculum-DQM agent 132 may then gradually increase the difficulty of the task of web navigation agent 130 over a number of training steps. More particularly, curriculum-DQN agent 132 may decompose an instruction into multiple sub-instructions and assign web navigation agent 130 with the relatively simpler task of solving a subset of these sub-instructions. An expert instruction-following policy (ORACLE) can be used to bring web navigation agent 130 closer to its goal.

However, expert demonstrations and/or ORACLE policies may not always available be available to train the web navigation agent. For example, expert demonstrations may require considerable manual labor, which may be expensive, time-consuming, and/or not scalable. Accordingly, in another aspect of the present disclosure, a meta-learning framework may be employed to train a generative model (INET described herein) to generate expert demonstrations (also referred to herein as "synthetic ORACLE" or "synthetic expert demonstrations") using an arbitrary or random web navigation policy, without specific instructions from a user. For example, an arbitrary navigation policy (e.g., random policy) may be treated as if it was an expert instruction-following policy (ORACLE) for some hidden or yet-to-be-determined natural language instruction. If the underlying hidden instruction is recovered using techniques described herein, it is possible to autonomously generate new, synthetic expert demonstrations. In the absence of "genuine" expert demonstrations, these synthetic expert demonstrations may be used as training data to substantially scale up the training of web navigation agent 130. Intuitively, generating an instruction from a policy is less complex than following an instruction, as web navigation agent 130 does not need to interact with a dynamic web page and perform complicated actions. Thus, techniques are described herein for training meta-trainer 134 to generate synthetic expert demonstrations than can be used in turn to train web-navigation agent 130.

Various neural network architectures are described herein for encoding two different web navigation Q-value functions that are utilized by web navigation agent 130 to navigate through websites in response to natural language commands. Two of these, QWeb 136 and "INET" 138, are described herein and utilize various combinations of self-attention, long short-term memory ("LSTM") network(s), and shallow encoding. QWeb 136 may be employed by web navigation agent 130 to navigate through interactive web documents. In particular, QWeb 136 is a Q-value function for a learned instruction-following policy, and may be trained by one or both of curriculum-DQN agent 132 or meta-trainer 134. INET 138 is a Q-value function that may be utilized by meta-trainer 134 in order to develop the aforementioned synthetic expert demonstrations. These demonstrations may then be used to train web navigation agent 130 in the absence of (or to compliment) genuine expert demonstrations.

Although techniques described herein are focused on web navigation, this is not meant to be limiting. Disclosed techniques may be applicable to solve other goal-oriented tasks in large discrete state and action Markov Decision Processes.

In various implementations, QWeb 136 may be trained to learn a value function Q (s, a) which maps a state s to values over the possible set of actions a. At each time step and using QWeb 130, web navigation agent 130 observes a state $s_t$, takes an action $a_t$, and observes a new state $s_{t+1}$ and a reward $r_t = r(s_{t+1}, a_t)$. The goal is to maximize the sum of discounted rewards $\Sigma_t \, \gamma^t r_t$ by rolling out episodes as suggested by the value function Q (s, a) and accumulating the reward. In some implementations, the reward may be sparse and only available at the end of an episode. As an example, for only a small fraction of episodes that are successful, the reward is +1; in other cases it is −1. In such a scenario, the large state and action spaces make it difficult to train web navigation agent 130 to successfully navigate in a web environment.

In various implementations, a natural language instruction may be provided, e.g., as a spoken command from a user. In particular, the instruction may be broken down (e.g., by intent matcher 135 and/or other components described previously) into a list of fields F where each field is represented as a key-value pair (K, V) (ex. {from: "San Francisco", to: "LA", date: "12/04/2018"}), such that I=[F=(K, V)]. In some implementations, at each time step, a state of the environment $s_t$ includes the instruction I and a representation of the web page as a tree $D_t$ of DOM elements (DOM tree). Each DOM element may be represented as a list of named attributes such as "tag," "value," "name," "text," "id," "class," etc. The reward of the environment may be computed, for instance, by comparing the final state of an episode ($D_N$) with the final goal state G(I).

In some implementations, the action space may be constrained to Click(e) and Type (e, y) actions where e is a leaf DOM element in the DOM tree and y is a value of a field from the instruction. Both of these composite actions are mostly identified by the DOM element (e), e.g., a "text box" is typed with a sequence whereas a "date picker" is clicked. In some implementations, composite actions may be represented using a hierarchy of atomic actions, e.g., defined by the dependency graph in FIG. 2. Following this layout, the composite Q value function may be defined by modeling each node in this graph considering its dependencies:

$$Q(s,a) = Q(s,a_D) + Q(s,a_C | a_D) + Q(s,a_T | a_D, [a_C = \text{"type"}]) \quad (1)$$

where $a = (a_D, a_C, a_T)$ is the composite action, a D denotes selecting a DOM element, $a_C | a_D$ denotes a "click" or "type" action on the given DOM element, and $a_T | a_D$, $[a_C = \text{type}]$ denotes "typing a sequence from instruction" on the given DOM element. When executing the policy (during exploration or during testing), web navigation agent 130 first picks a DOM element with the highest $Q(s, a_D)$. Web navigation agent 130 may then choose between Type or Click on the chosen DOM element based on Q ($a_D$). Wb navigation agent 130 may then, for a type action, selects a value from the instruction using Q(s, $a_T | a_D, | [a_C = \text{"type"}]$). In sum, QWeb 136 is a deep Q network that may be trained to generate Q values for a given observation ($s_t = (I, D_t)$) and for each atomic action $a_D, a_C, a_T$.

Figure 3:
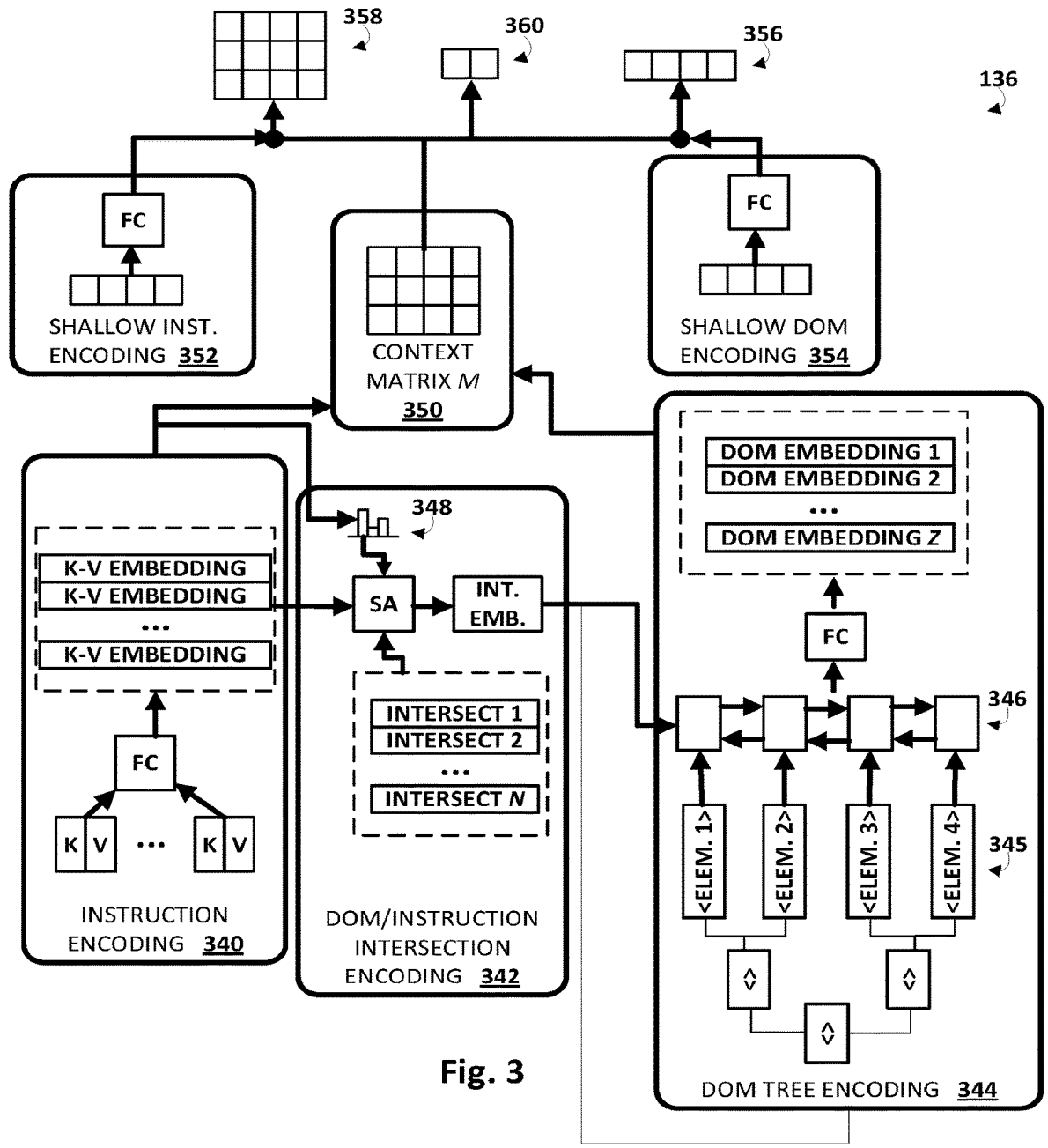
FIG. 3 schematically depicts an example web navigation machine learning architecture, referred to herein as "QWeb," that may be used by a web navigation agent configured with selected aspects of the present disclosure to automatically navigate interactive web documents.

FIG. 3 schematically depicted on example of how QWeb 136 may be implemented as a machine learning architecture. In this example, QWeb 136 includes three different layers 340-344 linked in a hierarchical structure. Each layer 340, 342, 344 may encode a different portion of a given state. An instruction encoding layer 340 may encode a user's natural language instruction, or more particular, the fields of key-value pairs that constitute an intent ascertained, e.g., by intent matcher 135, from the user's natural language instruction. A DOM tree encoding layer 344 may encode the DOM tree of the interactive web document under consideration.

An optional DOM/instruction intersection encoding layer 342 may encode overlapping words between the instruction and attributes of DOM elements of an interactive web page or document under consideration. Consequently, where layer 342 is present, some DOM element encodings may be conditioned based on elements of the instruction found to be similar.

In FIG. 3 and elsewhere herein, boxes indicate fully connected layers ("FC") with rectifier linear unit ("ReLU") activation (e.g., for instruction encoding) or tanh activation (e.g., for shallow encoding). (K, V) indicates embeddings of key and value pairs on the instruction. Each "<Elem>" represent a leaf DOM element embedding. "SA" denotes a self-attention mechanism that generates a distribution over the instruction fields. Black circles indicate gating mechanisms to join Q values generated by shallow and deep encodings.

At a high level, QWeb 136 may function as follows. Given an instruction I=[F=(K, V)], instruction encoding layer 340 encodes each field F into a fixed length vector by learning an embedding for each K and V. DOM/instruction intersection encoding layer 342 may encode a sequence of words that overlap between DOM element attribute(s) and the instruction I into a single vector. This vector may be used to condition each element on contextually-similar fields. In some implementations, DOM tree encoding layer 344 may encode the DOM tree 345 of the interactive web document under consideration by, for instance, linearizing the tree structure and running a bidirectional LSTM network 346 on top of the DOM elements sequence. Output of the LSTM network 346 and encodings of the instruction fields may be used to generate Q values for each atomic action $a_D$, $a_C$, $a_T$. These layers 340-344 will now be described in greater detail.

As alluded to above and depicted in FIG. 3, instruction encoding layer 340 may represent a user's natural language instruction using a list of vectors. Each vector may correspond to a different instruction field F. A field F may be encoded by encoding its corresponding key and value (e.g., K=destination; V="Louisville") and transforming the combined encodings via a FC with ReLU activation. Let $E_K^f(i, j)$ ($E_V^f(i, j)$) denote the embedding of the j-th word in the key (value) of i-th field. A key or value may be represented as the average of these embeddings over the corresponding words; i.e., $$E_K^f(i) = \frac{1}{|F(i)|} \sum_j E_K^f(i, j)$$

represents the encoding of a key. Encoding of a field may then be computed as follows:

$E^f(i) = FC([E_K^f(i), E_V^f(i)])$ where [,] denotes vector concatenation.

For DOM/instruction encoding layer 342, a sequence of overlapping words may be generated for each field in the instruction and each attribute of a DOM element (to the extent such overlap exists). By encoding these sequences in parallel, instruction-aware DOM element encodings may be generated. For example, the word embeddings may be averaged over each sequence and each attribute to compute the embedding of a DOM element conditioned on each instruction field. Using a self-attention mechanism, a probability distribution 348 may be computed over instruction fields to reduce this instruction-aware embedding into a single DOM element encoding. Let E (ƒ,$D_t(i)$) denote the embedding of a DOM element conditioned on a field ƒ where $D_t(i)$ is the i-th DOM element. Conditional embedding of $D_t(i)$ is the weighted average of these embeddings, i.e., $E_C = \Sigma_f p_f * E(f, D_t(i))$ where self-attention probabilities are computed as $p_f = \text{softmax}_i(u * E^f)$ with u being a trainable vector.

For DOM tree encoding layer 344, each DOM element attribute may be represented by averaging its word embeddings. Each DOM element may be encoded, for instance, as the average of its attribute embeddings. Conditioned DOM element encodings generated by DOM/instruction intersection encoding layer 342 may be concatenated with DOM element embeddings generated by DOM tree encoding layer 344 to generate a single vector for each DOM element. In various implementations, a bidirectional LSTM (biLSTM) network 346 may be applied to the list of DOM element embeddings to encode the DOM tree 345. Each output vector of the biLSTM network 346 may be transformed through another FC layer, e.g., with the tanh activation function, to generate DOM element embeddings 1-Z. Although examples described herein use biLSTM networks, this is not meant to be limiting. Other types of networks that are usable to encode individual elements and relationships between those elements may be employed instead, such as graph neural networks ("GNN"), TreeLSTM, etc.

With encodings for each field in the instruction generated by instruction encoding layer 340 and the encodings for each DOM element in the DOM tree generated by DOM tree encoding layer 344, pairwise similarities may be computed between each field and each DOM element to generate a context matrix M 350. Rows and columns of context matrix M represent posterior values for each field and each DOM element in the current state, respectively. By transforming through a FC layer (not depicted) and summing over the rows of M, Q values 356 may be generated for each DOM element, i.e., $Q(s_t, a_t^D)$. The rows of M may be used, for instance, as the Q values 358 for typing a field from the instruction to a DOM element, i.e., $Q(s_t, a_t^T) = M$. Additionally, Q values 360 for "click" or "type" actions on a DOM element may be generated by transforming the rows of context matrix M into two-dimensional vectors, e.g., using another FC layer (not depicted), i.e., $Q(s_t, a_t^C)$. A final Q value for a composite action $a_t$ may then be computed by summing these Q values 356-360: $Q(s_t, a_t) = Q(s_t, a_t^D) + Q(s_t, a_t^T) + Q(s_t, a_t^C)$.

In scenarios where rewards are sparse and the potential input vocabulary is large, such as operating web navigation agent to automatically navigate through flight-booking environments with hundreds of airports, it is difficult to learn a good semantic similarity using only word embeddings. Accordingly, in some implementations, QWeb 136 may be augmented with shallow instruction encodings 352 and shallow DOM tree encodings 354. A joint shallow encoding matrix of fields and elements may be generated by computing word-based similarities (such as Jaccard similarity, binary indicators such as subset or superset) between each instruction field and each DOM element attribute. Shallow encodings of siblings of each DOM element may also be appended to explicitly incorporate the relationships between the DOM elements of the interactive web document under consideration (e.g., the DOM hierarchy). A sum may be calculated over columns and rows of the shallow encoding matrix to generate shallow input vector 354 for DOM elements and shallow input vector 352 for instruction fields. These vectors may be transformed using respective FC layers, e.g., with the tanh activation function, and scaled via one or more trainable variables to generate a single value for a DOM element and a single value for an instruction field.

Using one or more gating mechanisms (black circles in FIG. 3) between deep Q values and shallow Q values, final Q values may be computed in some implementations as follows:

$$\hat{Q}(s_t, a_t^D) = Q_{deep}(s_t, a_t^D)(1-\sigma(u)) + Q_{shallow}(s_t, a_t^D)(\sigma(u)) \quad (2)$$

$$\hat{Q}(s_t, a_t^T) = Q_{deep}(s_t, a_t^T)(1-\sigma(v)) + Q_{shallow}(s_t, a_t^T)(\sigma(v)) \quad (3)$$

where u and v are scalar variables learned during training.

In various implementations, potential-based rewards may be employed for augmenting the environment reward function (which as described previously may be sparse). The environment reward is computed by evaluating if the final state is exactly equal to the goal state. Accordingly, a potential function (Potential(s, g)) may be defined that counts the number of matching DOM elements between a given state (s) and the goal state (g). This number may be normalized by the number of DOM elements in the goal state. Potential based reward may then be computed as the scaled difference between two potentials for the next state and current state, e.g., using an equation such as the following:

$$R_{potential} = \gamma(\text{Potential}(s_{t+1}, g) - \text{Potential}(s_t, g)) \quad (4)$$

where g is the goal state.

To demonstrate, FIGS. 4A-D depict four different stages of interaction with a flight-booking webpage rendered on a client device 206 in the form of a smart phone or tablet computer. The flight booking webpage may be used to a one-way ticket on "Hypo Airlines." There are three DOM elements in FIGS. 4A-D from which a reward can be computed: "from," "to," and "departure date." Assume that at a current time step web navigation agent 130 correctly enters the date. The potential for the current state will increase by ⅓ compared to the potential of the previous state and web navigation agent 130 will receive a positive reward.

Referring back to FIG. 1, curriculum-DQN agent 132 may be configured to implement curriculum learning by decomposing a natural language instruction into multiple sub-instructions and assigning web navigation agent 130 with the relatively simple task of solving subset of these sub-instructions. Various different curriculum learning strategies may be employed by curriculum-DQN agent 132 to train QWeb 136 (so that web navigation agent 130 is more effective when applying QWeb 136), web navigation: (i) "warm-starting" or "bootstrapping" an episode, and/or (ii) simulating sub-goals.

An episode may be "warm-started" or "bootstrapped" by placing web navigation agent 130 closer to the goal state where web navigation agent 130 can "learn" to perform a small number of sub-instructions to successfully finish the episode. FIG. 5 depicts an example "Algorithm 1" for warm-starting an episode. "Algorithm 2," which is employed as part of Algorithm 1, is depicted in FIG. 6. FIG. 4E demonstrates how the different web document states of FIGS. 4A-D may be analyzed using curriculum-DQN, in accordance with various implementations.

Each DOM element may be independently visited with a certain probability p and an ORACLE policy may be probed to perform a correct action on the selected DOM element. The environment for web navigation agent 130 may be initialized, for instance, with the final state of the warm-start process, while the original goal of the environment may be kept the same. This process is also illustrated in FIG. 4E for the flight-booking interactive document of FIGS. 4A-D. In this example scenario, web navigation agent 130 starts at the right side from the partially filled web form (origin and departure dates are already entered) and is only tasked with learning to correctly enter the destination airport. At the beginning of training, the probability p may be initialized with a relatively large probability (e.g., greater than 0.5, such as 0.85) and may be gradually decayed towards 0.0 over some predefined number of steps. After this limit, the initial state of the environment will revert to the original state of the original DOM tree with a full natural language instruction.

Additionally or alternatively, in some implementations, simpler but related sub-goals may be simulated for web navigation agent 130 by constraining an episode to a subset of the DOM elements of the interactive web document such that only the corresponding sub-instructions are needed to successfully finish an episode. A subset of DOM elements of size K may be randomly selected. The ORACLE (e.g., expert demonstration) may be probed to perform a correct set of actions on the selected subset of DOM elements to generate a sub-goal. The goal of the environment for web navigation agent 130 may be assigned with the final state of this process. The initial state of the environment may remain unchanged. Web navigation agent 130, implementing QWeb 136, may receive a positive reward if it can successfully reach to this sub-goal. At the beginning of training, K may be set to one and may be gradually increased over some number of steps towards the maximum number of DOM elements in the DOM tree of the interactive web document under consideration. After this limit, the environment will revert to the original environment, similar to the warm-start approach.

As mentioned above, there may be situations in which expert demonstrations and/or the ORACLE policy are not available. Accordingly, in some such implementations, INET 138 used by meta-trainer 134 may be trained to recover instructions implied by a non-expert policy, e.g. a rule-based policy or a random policy. Once INET 138 is trained, it may be used by meta-trainer 134 to generate synthetic expert demonstrations that are usable to train the web navigation agent 130. Algorithm 3 depicted in FIG. 7 is one example technique of how INET 138 may be trained.

Figure 9:
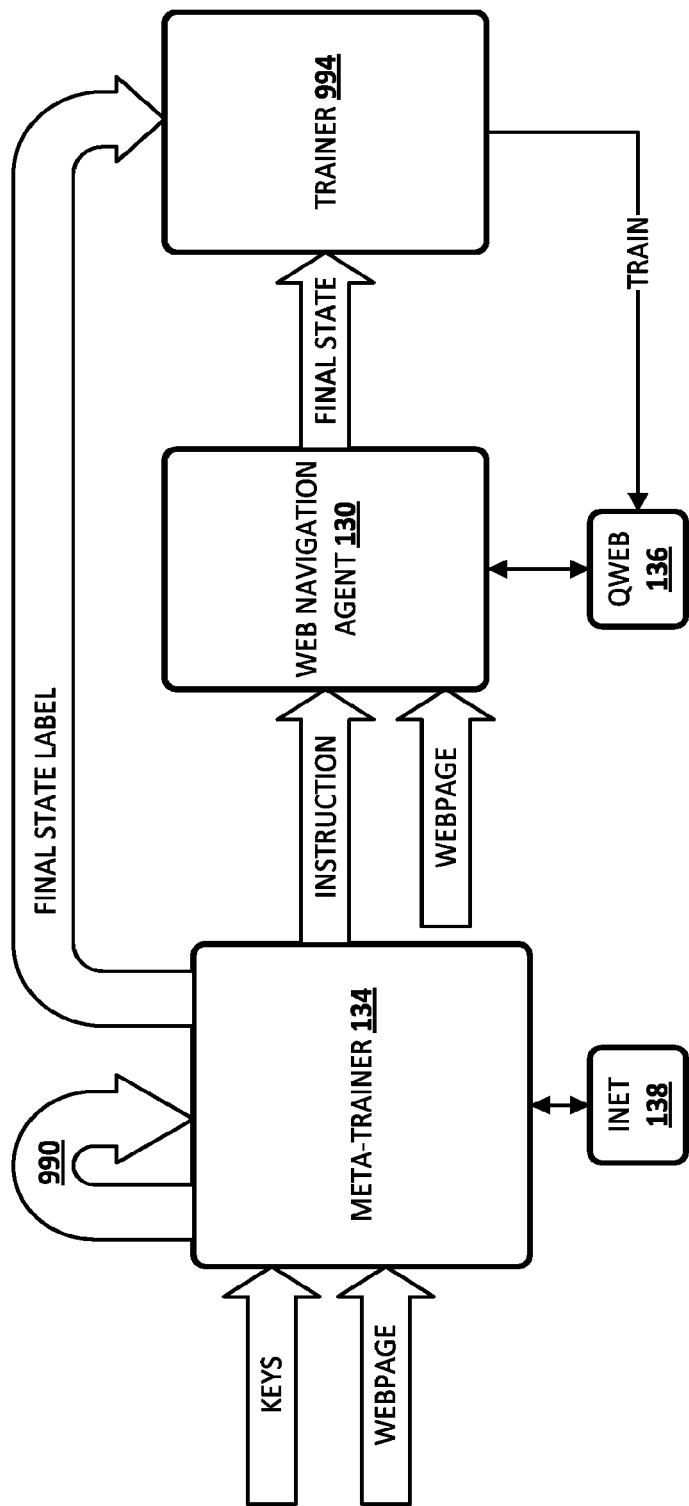
FIG. 9 schematically depicts an example of how the INET described herein may be used to generate synthetic training data to train the QWeb described herein.

FIG. 9 demonstrates one example of how meta-trainer 134 may generate synthetic instructions based on INET 138, and how those synthetic instructions may then be used to train QWeb 136. As shown, meta-trainer 134 receives, as input, one or more key(s) and a target interactive web document that includes, for instance, one or more interactive DOM elements. Meta-trainer 134 processes these data as described below using INET 138. Meta-trainer 134 also randomly samples a goal state for the DOM elements at 990, e.g., by randomly filling in values for each DOM element.

In some implementations, meta-trainer 134 may derive an instruction or learned from this sampled goal state. An "instruction state" may be defined by a pair that includes a sampled goal and a single key (K) sampled without replacement from a set of possible keys predefined for an interactive web document under consideration. A DOM element ($\hat{a}_t^D$) may be selected, and a value that corresponds to the current key (K), ($\hat{a}_t^D$) may be generated. For example, in a flight-booking environment such as that depicted in FIGS. 4A-D, the list of possible keys are defined by the set {from, to, date}. In various implementations, these keys may be curated by human(s), extracted from DOM elements of the web page under consideration, etc.

As shown in FIG. 9, the synthetic instruction generated by meta-trainer 134 can eventually be provided as input to web navigation agent 130, along with the interactive web document under consideration. Web navigation agent 130 may use QWeb 136 to process these input data and generate a final state of the interactive web document under consideration. The instruction input to QWeb may be labeled with a final state label generated by meta-trainer 134 when it randomly populated each of the DOM elements (i.e. sampled the final goal state). This final state label may be compared, e.g., by a trainer 994, to the final state output by web navigation agent 130. To the extent the output of web navigation agent 130 differs from the final state label, that may be considered error that can be used to train QWeb, e.g., using techniques such as back propagation, gradient descent, etc.

Figure 8:
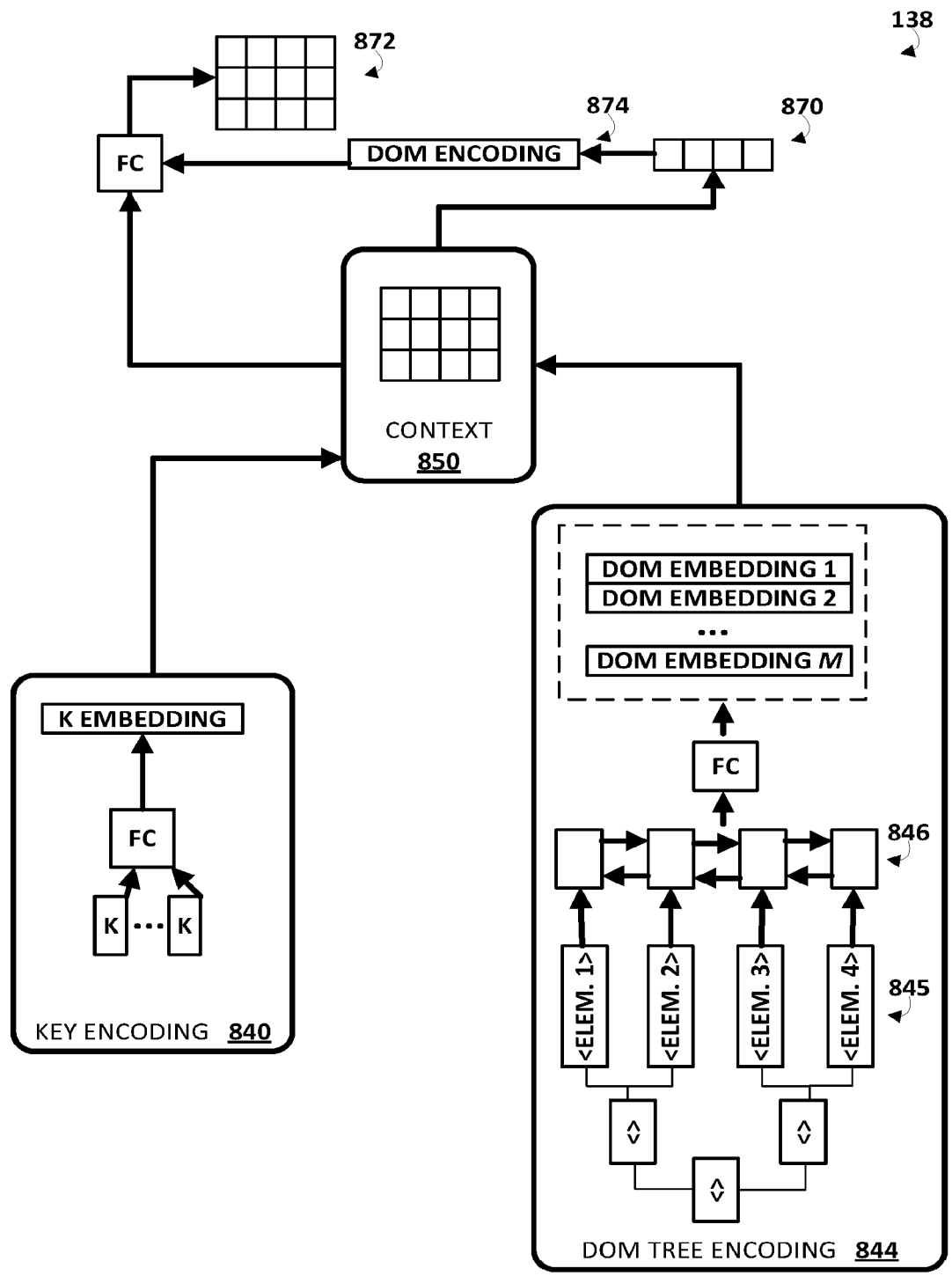
FIG. 8 depicts an example synthetic training data machine learning architecture, referred to herein as "INET," that may be trained and applied to generate synthetic training data, e.g., in the form of synthetic expert demonstrations, that in turn can be used to train a web navigation machine learning architecture such as QWeb depicted in FIG. 3.

Referring now to FIG. 8, in various implementations, INET 138 may take the form of a deep Q network. INET 138 may be trained (e.g., using Algorithm 3 in FIG. 7) to learn a Q value function approximation for the instruction generation environment associated with meta-trainer 134. A DOM tree encoding layer 844 of INET 138 may be similar to DOM tree encoding layer 344 associated with QWeb 136, and may be used by meta-trainer 134 to generate a vector representation for each DOM element in the DOM tree 845 of the current web page under consideration (e.g., using a biLSTM encoder as before).

Keys in the environment state (which as noted above may be provided by humans, extracted from DOM elements, etc.) may be encoded, e.g., by a key encoding layer 840, similarly to instruction encoding layer 340 of QWeb 136, except that only the key is input to the encoding layer, not any value. A Q value 870 for selecting a DOM element of the interactive web document under consideration may be computed, for instance, by learning a similarity between the key and DOM elements, e.g., $Q^I(s_t, â_t^D)$ where $Q^I$ denotes the Q values for meta-trainer 134. Element 874 represents an encoding of the DOM element that is selected based on this Q value.

A probability distribution may be generated over DOM elements by using the same similarity between the key and DOM elements, and in some cases by reducing their encodings into a single DOM tree encoding. Q value(s) 872 for DOM attribute(s) may be generated by transforming a context vector 850, as well as a concatenation of the DOM tree encoding 874 and the key encoding(s), into scores over the possible set of DOM attributes, e.g., $Q^I(s_t, â_t^K)$. Final Q values may be computed by combining the two previously-calculated Q values, e.g., using the following equation:

$$Q^I(s_t, a_t) = Q^I(s_t, â_t^D) + Q^I(s_t, â_t^K) \qquad (5)$$

In some implementations, a rule-based randomized policy ("RRND") may be employed to cause web navigation agent 130 to iteratively visit each DOM element in the current state and take an action. If the action is Click(e), web navigation agent 130 may on click on the element, and the process may continue. If the DOM element is part of a group, and their values depend on state(s) of other elements in the group (such as radio buttons), web navigation agent 130 may click on one of them randomly and ignore the others. However, if the action is Type(e, t), a typed sequence may be randomly selected from a given knowledge source. As one example, consider the flight-booking example of FIGS. 4A-D. If the visited DOM element is a text box, web navigation agent 130 may employ RRND to randomly pick an airport from a list of available airports and type the selected airport code into the text box. Web navigation agent 130 may stop employing RRND after every DOM element in the interactive web document under consideration is visited and a final DOM tree (D) is generated.

Using INET 138, meta-trainer 134 may generate an instruction I from the final DOM tree D and set up the web navigation environment using the pair (I, D). After web navigation agent 130 (applying QWeb 136) takes an action and observes a new state in the web navigation environment, the new state may be provided to meta-trainer 134 to collect a meta-reward (R1). A final reward may be computed by adding R1 to the environment reward, i.e., R=R1+R2.

The RRND described above is not meant to be limiting. In other implementations, a different kind of policy may be designed to collect desired final states. Additionally, the generated goal states (D) need not be valid goal states. Meta-trainer 134 can still train QWeb 136 by leveraging incomplete episodes as well as the instruction and goal pairs that the web navigation environment assigns. Meta-trainer 134 and INET 138 may be used for a variety of other purposes as well, e.g., to generate supervised episodes and perform behavioral cloning, to schedule a curriculum from the episodes generated by meta-trainer 134, etc.

Figure 10:
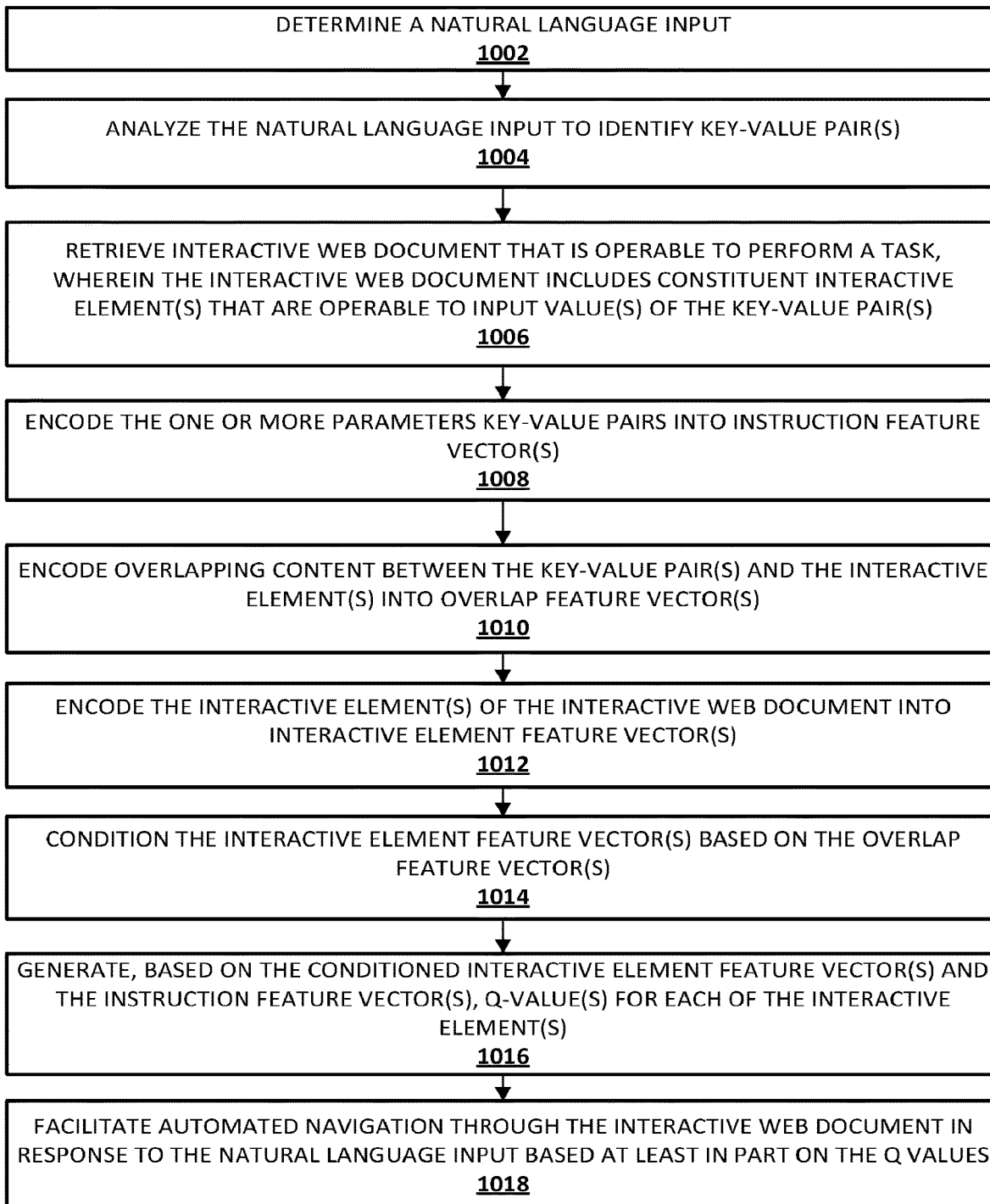
FIG. 10 depicts an example method for automatically navigating an interactive web document using a machine learning architecture such as QWeb depicted in FIG. 3.

Referring now to FIG. 10, one example method 1000 of practicing selected aspects of the present disclosure is described. In particular, method 1000 may be implemented by web navigation engine 130 to automatically navigate an interactive web document based on a user's natural language instruction. For convenience, the operations of the flow chart are described with reference to a system that performs the operations. This system may include various components of various computer systems, including various engines described herein. Moreover, while operations of method 1000 are shown in a particular order, this is not meant to be limiting. One or more operations may be reordered, omitted or added.

At block 1002, the system may determine a natural language input. The natural language input may take the form of a command, such as "find me flights from London to New York next Thursday," to perform a task, such as filling out a web form with these data and retrieving responsive results. At block 1004, the system may analyze the natural language input to identify one or more key-value pairs. In some implementations, the intent matcher 135 and other components described with respect to FIG. 1 may be used to generate a user's intent from a spoken or typed natural language input. That user intent may take the form of one or more fields, each field comprising a key and a value.

At block 1006, the system may retrieve an interactive web document that is operable, e.g., using a GUI such as a web browser, to perform the task. In various implementations, the interactive web document may take the form of a web page (e.g., an HTML, XML, CSS, or other similar document) that includes one or more constituent interactive elements that are operable to input one or more values of the one or more key-value pairs. As noted previously, these constituent elements may take the form of DOM elements in some implementations.

At block 1008, the system, e.g., by way of instruction encoding layer 340, may encode the one or more parameters key-value pairs into one or more instruction feature vectors as described previously. At block 1010, the system, e.g., by way of DOM/instruction intersection encoding layer 342 described previously, may encode overlapping content between the one or more key-value pairs and the one or more interactive elements into one or more overlap feature vectors. At block 1012, the system, e.g., by way of DOM instruction encoding layer 344 described previously, may encode the one or more interactive elements of the interactive web document into one or more interactive element feature vectors. At block 1014, the system may condition the one or more interactive element feature vectors based on the one or more overlap feature vectors encoded at block 1010.

At block 1016, the system may generate, based on the one or more conditioned interactive element feature vectors and the one or more instruction feature vectors, one or more Q-values for each of the one or more interactive elements. In various implementations, these Q values may take the form of composite Q values that each includes a DOM selection Q value 356, a Q value 358 for typing a field from the instruction to a DOM element, and a Q value 360 for "clicking" or "typing" actions on a DOM element. At block 1018, the system may facilitate automated navigation through the interactive web document in response to the natural language input based at least in part on the Q values.

Figure 11:
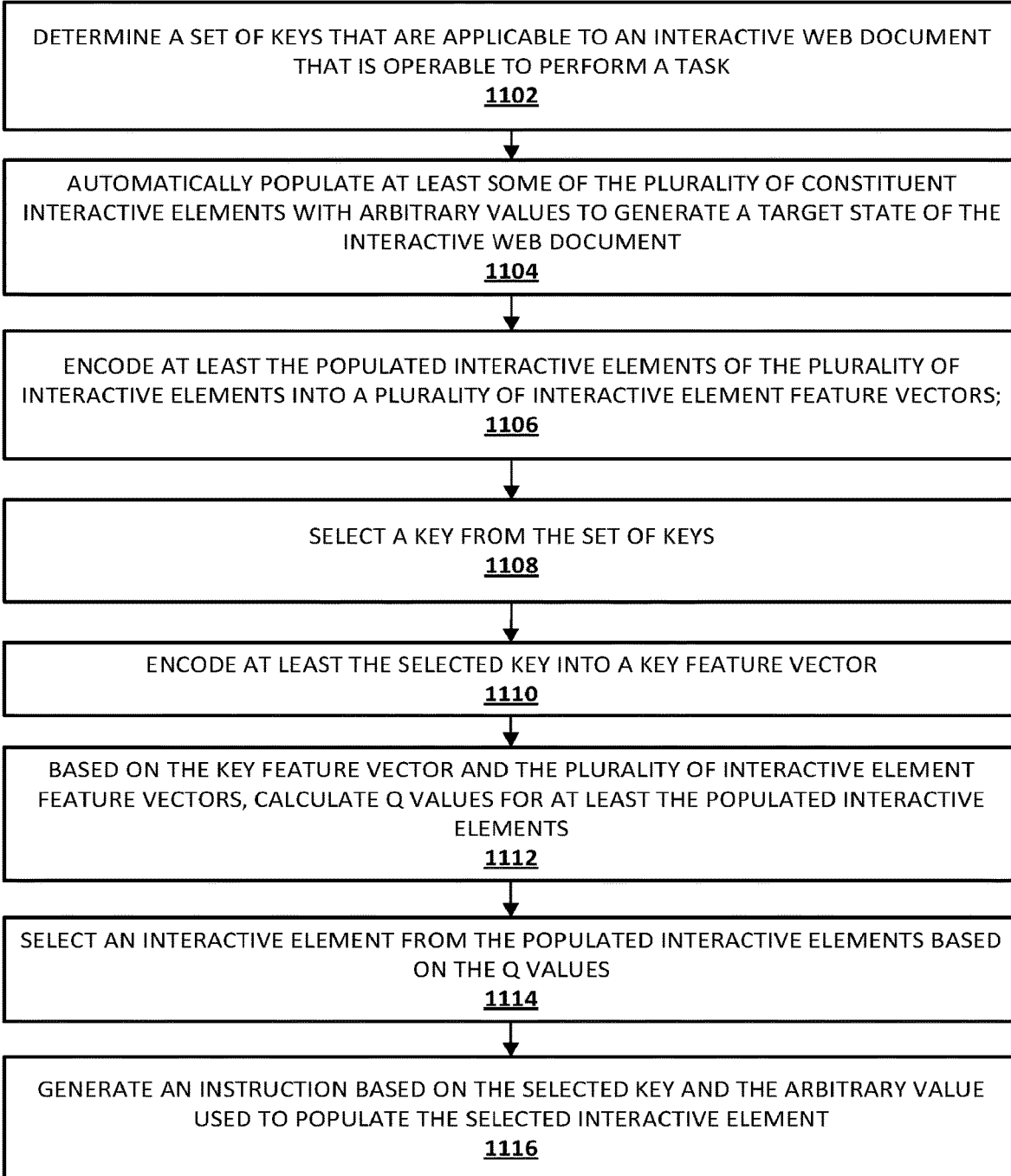
FIG. 11 depicts an example method for using a synthetic training data machine learning architecture, such as INET depicted in FIG. 8, to generate synthetic expert demonstrations.

Referring now to FIG. 11, one example method 1100 of practicing selected aspects of the present disclosure is described. In particular, method 1100 may be performable by meta-trainer 134 using INET 138 to generate synthetic expert demonstrations that may be used to train QWeb 136. For convenience, the operations of the flow chart are described with reference to a system that performs the operations. This system may include various components of various computer systems, including various engines described herein. Moreover, while operations of method 1100 are shown in a particular order, this is not meant to be limiting. One or more operations may be reordered, omitted or added.

At block 1102, the system may determine a set of keys that are applicable to an interactive web document that is operable, e.g., via a GUI, to perform a task. These keys may be manually curated by one or more people, extracted from DOM elements of interactive web documents, etc. As was the case previously, the interactive web document may include a plurality of constituent interactive elements that are operable to input a corresponding plurality of values.

At block 1104, the system may automatically populate at least some of the plurality of constituent interactive elements with arbitrary values to generate a target state of the interactive web document. In some implementations, these values may be random values. In other implementations, the arbitrary values may be selected using various heuristics or other rules.

At block 1106, the system, e.g., by way of DOM tree encoding layer 844, may encode at least the populated interactive elements of the plurality of interactive elements into a plurality of interactive element feature vectors. At block 1108, the system may select a key from the set of keys, e.g., at random or based on rules/heuristics. At block 1110, the system, e.g., by way of key encoding layer 840, may encode at least the selected key into a key feature vector.

Based on the key feature vector and the plurality of interactive element feature vectors, at block 1112, the system, e.g., by way of meta-trainer 134 using INET 138, may calculate Q values for at least the populated interactive elements. At block 1114, the system may select an interactive element from the populated interactive elements based on the Q values calculated at block 1112. At block 1116, the system may generate an instruction based on the selected key and the arbitrary value used to populate the selected interactive element. As noted previously, this instruction, e.g., in conjunction with the target state generated at block 1104, may be used as a synthetic expert demonstration to train QWeb 136.

Figure 12:
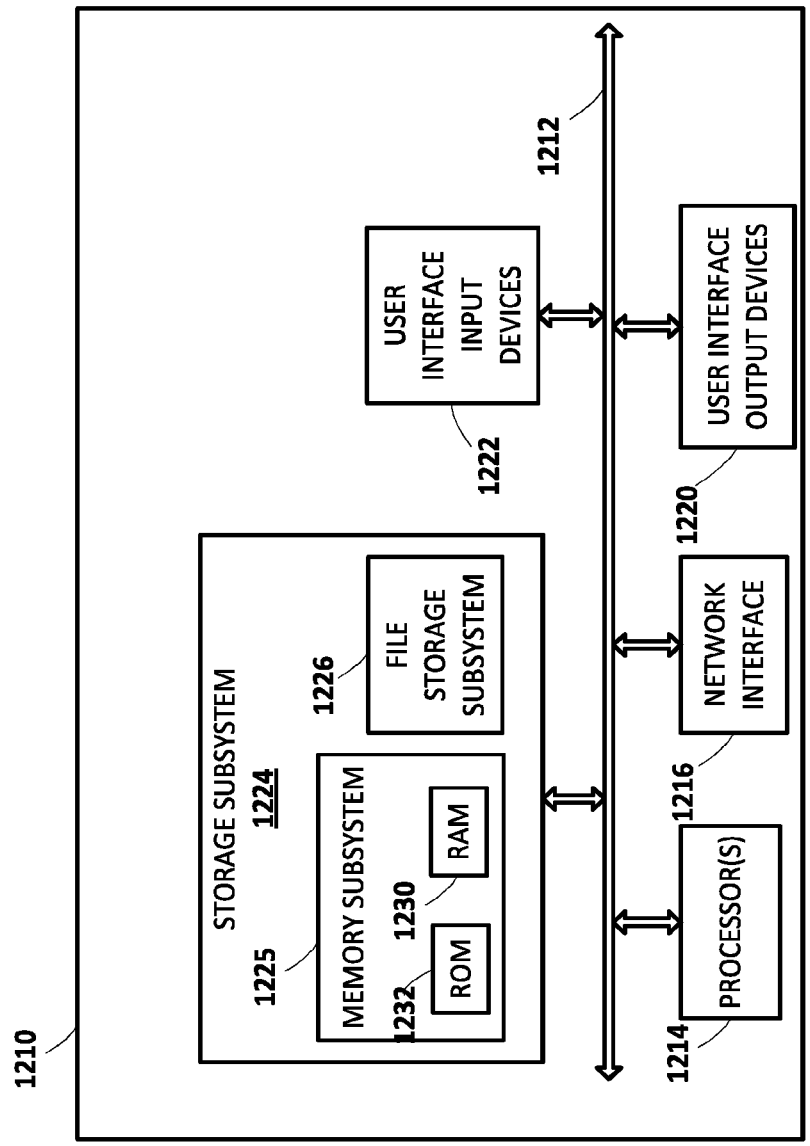
FIG. 12 schematically depicts an example architecture of a computer system.

FIG. 12 is a block diagram of an example computer system 1210. Computer system 1210 typically includes at least one processor 1214 which communicates with a number of peripheral devices via bus subsystem 1212. These peripheral devices may include a storage subsystem 1224, including, for example, a memory subsystem 1225 and a file storage subsystem 1226, user interface output devices 1220, user interface input devices 1222, and a network interface subsystem 1216. The input and output devices allow user interaction with computer system 1210. Network interface subsystem 1216 provides an interface to outside networks and is coupled to corresponding interface devices in other computer systems.

User interface input devices 1222 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 1210 or onto a communication network.

User interface output devices 1220 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 1210 to the user or to another machine or computer system.

Storage subsystem 1224 stores programming and data constructs that provide the functionality of some or all of the modules described herein. For example, the storage subsystem 1224 may include the logic to perform selected aspects of method 1000 or 1100, and/or to implement components of FIGS. 1, 3, 8, and/or 9.

These software modules are generally executed by processor 1214 alone or in combination with other processors. Memory 1225 used in the storage subsystem 1224 can include a number of memories including a main random access memory (RAM) 1230 for storage of instructions and data during program execution and a read only memory (ROM) 1232 in which fixed instructions are stored. A file storage subsystem 1226 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1226 in the storage subsystem 1224, or in other machines accessible by the processor(s) 1214.

Bus subsystem 1212 provides a mechanism for letting the various components and subsystems of computer system 1210 communicate with each other as intended. Although bus subsystem 1212 is shown schematically as a single bus, alternative implementations of the bus subsystem may use multiple busses.

Computer system 1210 can be of varying types including a workstation, server, computing cluster, blade server, server farm, or any other data processing system or computing device. Due to the ever-changing nature of computers and networks, the description of computer system 1210 depicted in FIG. 12 is intended only as a specific example for purposes of illustrating some implementations. Many other configurations of computer system 1210 are possible having more or fewer components than the computer system depicted in FIG. 12.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, comprising:
   determining a natural language input, wherein the natural language input comprises a command to perform a task;
   analyzing the natural language input to identify one or more key-value pairs;
   retrieving an interactive web document that is operable via a graphical user interface ("GUI") to perform the task, wherein the interactive web document includes one or more constituent interactive document object model (DOM) elements that are operable to input one or more values of the one or more key-value pairs;
   encoding the one or more key-value pairs into one or more instruction feature vectors;
   encoding one or more words of the one or more key-value pairs that overlap with one or more attributes of one or more of the interactive DOM elements into one or more overlap feature vectors;
   encoding the one or more interactive DOM elements of the interactive web document into one or more interactive DOM element feature vectors;
   conditioning the one or more interactive DOM element feature vectors based on the one or more overlap feature vectors to generate one or more conditioned interactive DOM element feature vectors, wherein the conditioning includes performing an operation using the one or more interactive DOM element feature vectors and the one or more overlap feature vectors as operands;
   generating, based on the one or more conditioned interactive element feature vectors and the one or more instruction feature vectors, one or more probability distributions over the one or more interactive elements; and
   facilitating automated navigation through the interactive web document in response to the natural language input based at least in part on one or more of the probability distributions.

2. The method of claim 1, wherein the operation comprises concatenation.

3. The method of claim 1, further comprising linearizing a tree structure that represents the interactive DOM elements into a sequence of DOM elements.

4. The method of claim 1, wherein a long-short term memory ("LSTM") network is used to encode the one or more interactive DOM element feature vectors.

5. The method of claim 4, wherein the LSTM network comprises a bidirectional LSTM network.

6. The method of claim 1, wherein the one or more probability distributions comprise a composite Q value.

7. The method of claim 6, wherein the composite Q value comprises an interactive DOM element Q value, a click-or-type Q value, and a type Q value.

8. A method implemented using one or more processors, comprising:
   determining a set of keys that are applicable to an interactive web document that is operable via a graphical user interface ("GUI") to perform a task, wherein the interactive web document includes a plurality of constituent interactive document object model (DOM) elements that are operable to input a corresponding plurality of values;
   automatically populating at least some of the plurality of constituent interactive DOM elements with arbitrary values to generate a target state of the interactive web document;
   encoding at least the populated interactive DOM elements of the plurality of interactive elements into a plurality of interactive DOM element feature vectors;
   selecting a key from the set of keys;
   encoding at least the selected key into a key feature vector;
   based on the key feature vector and the plurality of interactive DOM element feature vectors, calculating one or more probability distributions over the populated interactive DOM elements;
   selecting an interactive DOM element from the populated interactive DOM elements based on the one or more probability distributions; and
   generating an instruction based on the selected key and the arbitrary value used to populate the selected interactive DOM element.

9. The method of claim 8, wherein the instruction comprises one or more fields, each of the one or more fields comprising a key-value pair.

10. The method of claim 8, wherein a long-short term memory ("LSTM") network is used to encode the plurality of interactive DOM element feature vectors.

11. The method of claim 10, wherein the LSTM network comprises a bidirectional LSTM network.

12. The method of claim 8, wherein the one or more probability distributions for at least the populated interactive DOM elements comprise a Q value for each interactive DOM element and a Q value for each attribute of each interactive DOM element.

13. The method of claim 8, wherein the arbitrary values comprise random values.

14. A system comprising one or more processors and memory storing instructions that, in response to execution of the instructions by the one or more processors, cause the one or more processors to:
   determine a natural language input, wherein the natural language input comprises a command to perform a task;
   analyze the natural language input to identify one or more key-value pairs;

retrieve an interactive web document that is operable via a graphical user interface ("GUI") to perform the task, wherein the interactive web document includes one or more constituent document object model (DOM) interactive elements that are operable to input one or more values of the one or more key-value pairs;

encode the one or more key-value pairs into one or more instruction feature vectors;

encode overlapping content between the one or more key-value pairs and the one or more interactive DOM elements into one or more overlap feature vectors;

encode the one or more interactive DOM elements of the interactive web document into one or more interactive DOM element feature vectors;

condition the one or more interactive DOM element feature vectors based on the one or more overlap feature vectors to generate one or more conditioned interactive DOM element feature vectors, wherein the instructions to condition include instructions to perform an operation using the one or more interactive DOM element feature vectors and the one or more overlap feature vectors as operands;

generate, based on the one or more conditioned interactive element feature vectors and the one or more instruction feature vectors, one or more probability distributions over the one or more interactive elements; and facilitate automated navigation through the interactive web document in response to the natural language input based at least in part on one or more of the probability distributions.

15. The system of claim 14, wherein the operation comprises concatenation.

16. The system of claim 15, further comprising instructions to linearize a tree structure that represents the interactive DOM elements into a sequence of DOM elements.

17. The system of claim 14, wherein a long-short term memory ("LSTM") network is used to encode the one or more elements into a sequence of DOM element feature vectors.

18. The system of claim 17, wherein the LSTM network comprises a bidirectional LSTM network.

* * * * *